(12) United States Patent
Haberl et al.

(10) Patent No.: US 7,744,144 B2
(45) Date of Patent: Jun. 29, 2010

(54) REAR WINDOW CONTROL

(75) Inventors: Franz Haberl, Wallerfing (DE); Klaus Obendiek, Passau (DE)

(73) Assignee: Edscha Cabrio-Dachsysteme GmbH, Hengersberg (DE)

( * ) Notice: Subject to any disclaimer, the term of this patent is extended or adjusted under 35 U.S.C. 154(b) by 625 days.

(21) Appl. No.: 11/653,046

(22) Filed: Jan. 12, 2007

(65) Prior Publication Data

US 2007/0187981 A1   Aug. 16, 2007

(30) Foreign Application Priority Data

Jan. 13, 2006   (DE) ........................ 10 2006 002 030

(51) Int. Cl.
| | |
|---|---|
| *B60J 7/08* | (2006.01) |
| *B60J 7/12* | (2006.01) |
| *B60J 1/18* | (2006.01) |

(52) U.S. Cl. ............................ 296/107.07; 296/146.14
(58) Field of Classification Search ............ 296/107.01, 296/108, 107.07, 107.09, 107.16, 107.17, 296/146.14; 454/128, 134

See application file for complete search history.

(56) References Cited

U.S. PATENT DOCUMENTS

| | | | | | |
|---|---|---|---|---|---|
| 3,203,729 | A | * | 8/1965 | Brynn et al. ............ | 296/107.09 |
| 3,236,557 | A | * | 2/1966 | Podolan ....................... | 296/145 |
| 3,332,169 | A | * | 7/1967 | Lohr et al. ..................... | 49/249 |
| 3,333,362 | A | * | 8/1967 | Kostin et al. .................. | 49/248 |
| 4,626,020 | A | | 12/1986 | Kaltz et al. .................. | 296/107 |
| 4,693,509 | A | * | 9/1987 | Moy et al. .................... | 296/201 |
| 4,784,428 | A | * | 11/1988 | Moy et al. ............. | 296/107.07 |
| 6,123,381 | A | * | 9/2000 | Schenk .................. | 296/107.07 |
| 6,123,382 | A | | 9/2000 | Lorenz ................... | 296/146.14 |
| 6,425,620 | B1 | * | 7/2002 | Schutt et al. ........... | 296/107.07 |
| 6,454,342 | B2 | * | 9/2002 | Heselhaus et al. ...... | 296/107.07 |
| 6,485,085 | B1 | | 11/2002 | Pecho et al. ........... | 296/107.07 |
| 6,502,891 | B2 | * | 1/2003 | Russke ................... | 296/107.17 |
| 6,513,857 | B2 | * | 2/2003 | Pfertner et al. ......... | 296/107.07 |
| 6,536,831 | B2 | * | 3/2003 | Rothe et al. ............ | 296/107.07 |
| 6,578,898 | B2 | * | 6/2003 | Rothe et al. ............ | 296/107.07 |
| 6,585,310 | B1 | * | 7/2003 | Guillez et al. ................ | 296/108 |
| 6,629,718 | B2 | * | 10/2003 | Bauer et al. .................. | 296/108 |
| 7,014,246 | B2 | * | 3/2006 | Huedepohl ............. | 296/107.07 |
| 2001/0006297 | A1 | | 7/2001 | Dintner et al. ......... | 296/107.97 |

(Continued)

FOREIGN PATENT DOCUMENTS

DE   36 07 650 A1   9/1987

(Continued)

*Primary Examiner*—Patricia L Engle
(74) *Attorney, Agent, or Firm*—Davidson, Davidson & Kappel, LLC

(57) ABSTRACT

A device for activating a rear window of a motor vehicle is provided that includes a control lever designed as a 3-point link, which is pin-jointed at one end with the rear window. The device further includes a driving link, which can be driven rotatably about a first fixed bearing, and a coupling link, which is guided pivotably about a second fixed bearing. At least the first fixed bearing is arranged on a roof element of the motor vehicle, while the control lever is coupled to the driving link and the coupling link in a restricted guidance, such that a rotation of the driving link about the first fixed bearing shifts the linking point of the control lever to the rear window substantially vertically.

21 Claims, 17 Drawing Sheets

U.S. PATENT DOCUMENTS

| | | | |
|---|---|---|---|
| 2002/0005653 A1* | 1/2002 | Heselhaus et al. | 296/107.07 |
| 2002/0030380 A1* | 3/2002 | Rothe et al. | 296/107.07 |
| 2002/0175536 A1* | 11/2002 | Biecker et al. | 296/107.07 |
| 2003/0085587 A1* | 5/2003 | Reinsch | 296/107.17 |
| 2003/0218355 A1* | 11/2003 | Stenvers et al. | 296/108 |
| 2004/0094987 A1* | 5/2004 | Salz et al. | 296/107.01 |
| 2004/0108746 A1 | 6/2004 | Elliott | 296/100.16 |
| 2005/0218690 A1* | 10/2005 | Schuett et al. | 296/107.07 |
| 2005/0218691 A1 | 10/2005 | Obendiek | 296/108 |
| 2006/0202505 A1 | 9/2006 | Obendiek | 296/108 |

FOREIGN PATENT DOCUMENTS

| | | |
|---|---|---|
| DE | 43 20 603 C2 | 1/1995 |
| DE | 196 36 209 C1 | 12/1997 |
| DE | 197 53 209 C1 | 2/1999 |
| DE | 197 46 569 A1 | 5/1999 |
| DE | 198 04 101 C1 | 8/1999 |
| DE | 199 40 796 A1 | 3/2001 |
| DE | 199 57 427 C1 | 3/2001 |
| DE | 102 43 085 A1 | 3/2004 |
| DE | 103 44 679 A1 | 6/2005 |

* cited by examiner

REAR WINDOW CONTROL

FIELD OF THE INVENTION

The invention relates to a rear window control, i.e. a device for activating a rear window of a motor vehicle.

BACKGROUND

In particular in the case of cabriolets, it is customary practice to activate a rear window via separate link kinematics in order, when the top is closed, to permit the vehicle interior to be ventilated by opening the rear window. A separate activation of the rear window can also ensure a space-saving packing size of the top in the open state. A cabriolet-top arrangement of this type is known, for example, from DE 199 40 796 A1.

It is furthermore known from practice, in the case of motor vehicles with a cabriolet top which is designed as a fixed top, to fold the entire top and put it away in a storage compartment arranged in the region of the C-pillar. However, it is not possible here to put away part of the top in order to ventilate the interior of the motor vehicle while simultaneously retaining the rest of the top.

It is known from practice, in addition to the top kinematics driving a foldable pivoting top, to furthermore provide supporting arrangements for the rear window, which is embedded nondetachably in the pivoting top and, in particular, is made of glass, in order to avoid the top sagging due to the weight of the rear window and in order to stabilize the rear window. These supporting arrangements are only detachable if the folding top is to be put away and do not allow any possibility of ventilating the interior of the motor vehicle.

DE 36 07 650 A1 describes a cabriolet which has a rear window which is mounted in a frame, the frame together with the rear window closing the rear window opening in a raised position or opening it up in a lowered position. The change of position of the rear window takes place either via a handle or via a worm-worm gear system, with a pair of levers being fastened at one end to an upper flange of the frame and at the other end to a joint provided on the bodywork, and a second pair of levers being fastened to a lower flange of the frame and to an installation element. The pairs of levers basically define a four-bar linkage. The frame, together with the flat window fitted into it, executes a displacement essentially along a circular radius in order to be put away in a virtually vertical storage position behind the driver's seat. In order to obtain sealing contact against the roof structure, the frame, which imparts the actual rigidity to the rear window, is provided with a heavy, strip-shaped seal which is not provided in the region of the upper edge of the rear window. There is the risk that, under the dead weight of the window and due to vibrations which occur during the course of the journey, the window will gradually shift out of its position without the handle part being actuated. In the case of a motor drive, a separate brake is to be provided for this purpose, which further increases the outlay on the retractable rear window. Furthermore, it is to be noted that the lever protrudes at least partially into the passenger compartment and therefore executes annoying movements in the driver's head region, and that, due to the manner of storing the rear window, a construction of this type is basically only suitable for a two-seater cabriolet.

DE 198 04 101 C1 describes a folding top for cabriolets, in which a rear window rests on the outer side of a cabriolet top with a frame surrounding the rear window, wherein a flap which is provided on the outer frame can assume a position which leads out vertically from the plane of the window and which can be pivoted through 90° in order to be able to be folded behind the cabriolet top parallel to the frame, and therefore to hold the window together with the frame. The window is opened by the flap being pivoted up and the window being swung open outwards through approx. 135° via a piston/cylinder unit, so that the window can be put away with its outer side flat below the boot lid. For this purpose, the boot lid first of all has to be opened, to be precise about additional hinges provided on the rear side, with the rear window having to be of essentially flat design for this purpose. The result is that the rear window in particular cannot be opened during the journey and in particular cannot be partially opened.

DE 197 53 209 C1 describes, in a theoretical manner, a rear window which can be put away and, firstly, in its closed position, is connected to the C-pillars via connecting devices and can be put away into the boot via joints. The joints may involve a four-bar linkage.

DE 196 36 209 C1 describes a folding top for a cabriolet, in which a rear window made of glass or plastic is provided in the top cloth of a rear top part which can be put away independently of a front top part into a top compartment with a lid, with the two top parts, which are movable independently of each other, being mutually secured via a releasable locking arrangement (not explained in detail). Since the two top parts are cloth tops, a locking of the linkage beyond the dead centre position is to assume, in which the internal stress of the top cloth undertakes the mutual locking.

DE 197 46 569 A1 describes a cabriolet top, the rear part of which is divided into a main frame part and a rear frame part, wherein the rear frame part can be folded down in relation to the main frame part in order to provide a space-saving arrangement in the boot. The main frame part comprises the rear window. An actuation. of the rear frame part in order to open up a window opening is not described.

DE 43 20 603 C2 describes a cabriolet, in which a flat window which can be lowered by means of a hand crank or electric motor and which can be lowered and raised in an extension of its level plane is provided in the rear region.

In all of the abovementioned means of activating a rear window of a vehicle, there is the disadvantage that a corresponding kinematic articulation system is linked to the bodywork and takes up a comparatively large amount of construction space.

DE 199 57 427 C1 describes a cabriolet top comprising a fixed top part, a fixed rear part, a top compartment for receiving the top, said top compartment being arranged in a rear region of the bodywork, and a restricted guidance for opening and closing the top. In order to open the top, initially the rear part is pivoted over the top part, the top part and the above piled rear part beeing subsequently pivotable into the top compartment. The restricted guidance comprises a singe lever between the rear part and the compartment bodywork, said lever beeing pin-jointed with the rear part at its first end via a first arcticulation joint and beeing connected with the bodywork at its second end.

DE 102 43 085 A1 describes a cabriolet top comprising a first top part being formed by a fixed roof shell, a second top part being formed by a fixed roof shell, the first top part and the second top part being each pivotable with respect to the vehicle bodywork, and a restricted guidance, the first top part and the second top part being movable by means of the restricted guidance via a common force introduction unit. The flexibility of the guided movement of the roof parts with respect to each other is noticeable increased by means of a mechanic operating control comprised by the restricted guidance, whereat the movement of the second top part can be slowed down with respect to the movement of the first top part via the operating control.

DE 103 44 679 A1 describes a hardtop vehicle roof comprising three fixed roof parts which are supported by the bodywork via an kinematic articulation system and which are adjustable between a closed position, covering the inner compartment of the vehicle, and an opened storage position. The kinematic articulation system is composed by a seven-joint linkage, which connects all three roof parts and comprises three steering joints.

The three last-mentioned publications show vehicle rear windows which are liftable in a vertical direction.

Accordingly, the invention is based on the object of providing a means of activating a rear window which is constructed in a space-saving manner and with simple means.

SUMMARY OF THE INVENTION

This object is achieved according to the invention by a device for activating a rear window of a motor vehicle with the features of claim 1. Advantageous developments of the invention are the subject matter of the dependent claims.

A device according to the invention for activating a rear window of a motor vehicle comprises a control lever in the form of a 3-point link, which is pin-jointed at one end with the rear window, a driving link, which can be driven rotatably about a first fixed bearing, and a coupling link, which is guided pivotably about a second fixed bearing. At least the first fixed bearing, and preferably also the second fixed bearing, can be arranged on a roof element of the motor vehicle. The control lever is coupled to the driving link and to the coupling link in a restricted guidance, so that a rotation of the driving link about the first fixed bearing shifts the linking point of the control lever to the rear window substantially vertically.

The fixing of the first and second fixed bearings on the roof element of the vehicle has the advantage that the C-pillar of the vehicle does not require any complicated modifications, and, in particular, a linking lever does not have to be guided down from the rear window as far as the bodywork. This makes it possible to integrate the device according to the invention into vehicles while maintaining the external appearance. All of the moving linking elements of the device can be integrated in the region of the roof element and can be designed such that they are matched to the contour thereof. The device is equally suitable for fitting into the rear part of a fixed vehicle roof and into a fixed roof shell of a foldable cabriolet top.

Irrespective of the particular type of roof, actuation of the device according to the invention makes a ventilation position of the rear window possible, even if the vehicle roof as such and/or the side windows are closed.

In its closed position, the rear window is held in a rear window frame of the vehicle roof, so that the interior of the vehicle is thereby closed. Starting from the closed position, when the driving link is rotated about the first fixed bearing, the linking point of the control lever to the rear window is shifted substantially vertically downwards, which moves the rear window out of its rear window frame into a ventilation position. In the ventilation position, a gap is formed between an edge of the rear window and the rear window frame, thus providing ventilation of the vehicle interior.

According to the invention, a 3-point link is understood as meaning a linking lever which is provided with three articulation points. According to the invention, an articulation point ensures the articulated connection to another component or a bearing or the like. An articulation point is preferably arranged at each of the two outer ends of the control lever, with the third articulation point being provided in a central region of the control lever between the two outer articulation points.

In an advantageous development of the invention, the control lever can be of angled design at its central articulation point. This advantageously results in a compact fitting size of the device in the roof element, with a rotation of the driving link about the first fixed bearing being suitably converted into a relatively large shifting or displacement of the linking point of the control lever to the rear window substantially in the vertical direction.

In an advantageous development of the invention, a first auxiliary link in the form of a 3-point link and a second auxiliary link can be provided for the restricted guidance of the control lever. The first auxiliary link is linked at one end to the coupling link and is coupled at the other end to the control lever, with the driving link being linked to the central articulation point of the first auxiliary link. The second auxiliary link, which in turn is pin-jointed with the central articulation point of the control lever, is linked to the other end of the first auxiliary link. A rotation of the driving link about the first fixed bearing therefore directly brings about a shifting of the first auxiliary link substantially in the vertical direction, which is suitably transmitted to the control lever by means of the second auxiliary link via the coupling. As a result, the articulated connection of the lower end of the first auxiliary link to the coupling link leads to the desired restricted guidance of the control lever in order to shift the rear window into its ventilation position.

In an advantageous development of the invention, the driving link can be pin-jointed with the other end of the control lever, which end is opposite the linkage to the rear window, with the coupling link then being pin-jointed with the central articulation point of the control lever. The first and second auxiliary links are therefore not required, and so the device can be produced more cost-effectively with overall fewer links.

The device can expediently be used in a cabriolet top, in particular for fixing in a rear roof shell. In this case, that end of the coupling link which is opposite the first auxiliary link and the control lever, respectively, can be pin-jointed with a roof shell link linked to the second fixed bearing. The roof shell link is preferably linked at its end opposite the second fixed bearing to a second roof shell which is situated in front of the rear, first roof shell in the direction of travel. If, in order to open the cabriolet top, the rear, first roof shell is initially pivoted forwards in the direction of travel over the second roof shell by actuation of the roof shell link, the kinematic articulation system of the device according to the invention in the process ensures restricted control for the rear window, as a result of which the rear window is lifted out of its rear window frame in the first roof shell. If the first and second roof shells are put away in a package position at the rear of the vehicle in order to fully open the cabriolet top, the consequence of the rear window having been lifted out of the rear window frame is that the remaining available loading dimension in the vehicle rear is increased. The automatically occurring restricted guidance of the rear window makes it possible to effectively prevent the window from colliding with the roof shells when fully opening the cabriolet top. This renders a sensor for detecting the position of the rear window unnecessary. A further advantage of the abovementioned restricted control of the rear window is that a separate drive for lifting the rear window out of its frame during the opening of the cabriolet top can be omitted.

In an advantageous development of the invention, in the closed position of the rear window, the driving link passes into a position beyond the dead centre. A separate locking of the rear window in its closed position can therefore be omitted, which further reduces the production costs of the device.

The motor-powered drive of the driving link to rotate it about the first fixed bearing can advantageously take place via a rotary shaft, which is in engagement with a worm gear mechanism, or via a pull-push linkage. Both variants have the advantage that driving means of this type can be flexibly matched to the contour profile of the vehicle roof or of the roof shell and only take up a small amount of installation space. The device according to the invention is expediently provided in pairs, i.e. in a left and right region of the vehicle roof. The abovementioned driving means makes it possible to drive both driving links of the respective devices jointly by means of a single motor drive unit. The motor drive unit can be fixed in a central region of the vehicle roof or of the roof shell, with the rotary shaft respectively the pull-push linkage then being guided in each case to the left and right to the respective device. The use of a common motor drive unit reduces the costs and ensures synchronous driving of the two devices in a very simple manner.

Further advantages and refinements of the invention emerge from the description and the attached drawing. It goes without saying that the features mentioned above and those which have yet to be explained below can be used not only in the respectively stated combination, but also in other combinations or on their own without departing from the framework of the present invention.

The invention is illustrated schematically in the drawing using an exemplary embodiment and is described in detail below with reference to the drawing, in which:

DETAILED DESCRIPTION TO DRAWINGS

A first embodiment of a device 1 according to the invention, which is used in a foldable cabriolet top, is explained with reference to FIGS. 1 to 11.

Figure 1:
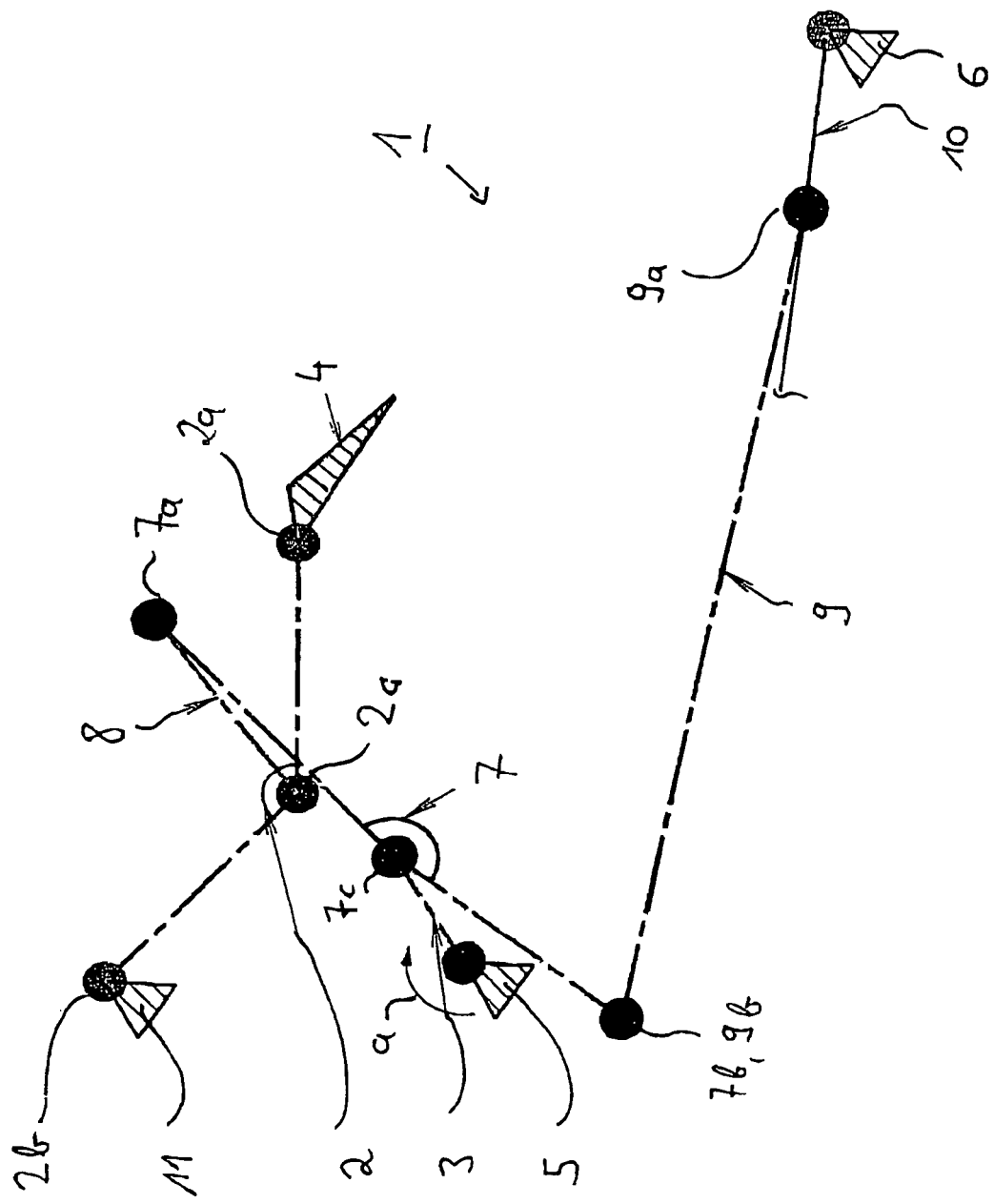
FIG. 1 shows a schematic illustration of the links of the device according to the invention, with a rear window in the closed position.

FIG. 1 shows the device 1 in a schematic illustration of the links. The device 1 comprises a control lever 2 in the form of a 3-point link, and a driving link 3. Within the framework of the present invention, a 3-point link is understood as meaning a link which has three articulation points or is pin-jointed at three points to further structural elements or to a bearing or the like. The control lever 2 therefore has a respective end articulation point 2a, 2b at both of its ends and a further articulation point 2c in its central region. The control lever 2 is pin-jointed at an end articulation point 2a with a rear window 4, and, at the other end articulation point 2b opposite thereto, is mounted rotatably about a third fixed bearing 11. In the region of the central articulation point 2c, the control lever 2 is of angled design, with the two limbs which lead to the end articulation points 2a, 2b being rigid with respect to each other.

The driving link 3 is mounted rotatably about a first fixed bearing 5. By means of suitable driving means, which are explained in more detail with reference to FIGS. 3 and 4, the driving link 3 can be driven rotatably about the first fixed bearing 5. The free end of the driving link 3 is pin-jointed with a central articulation point 7c of a first auxiliary link 7, which is likewise designed in the form of a 3-point link. An end articulation point 7a of the first auxiliary link 7 is pin-jointed with a second auxiliary link 8, which is pin-jointed with its opposite end to the central articulation point 2c of the control lever 2. The opposite end articulation point 7b of the first auxiliary link 7 is pin-jointed with an end articulation point 9b of a coupling link 9. The opposite end articulation point 9a of the coupling link 9 is linked to a roof shell link 10, which in turn is mounted rotatably about a second fixed bearing 6.

Figure 2:
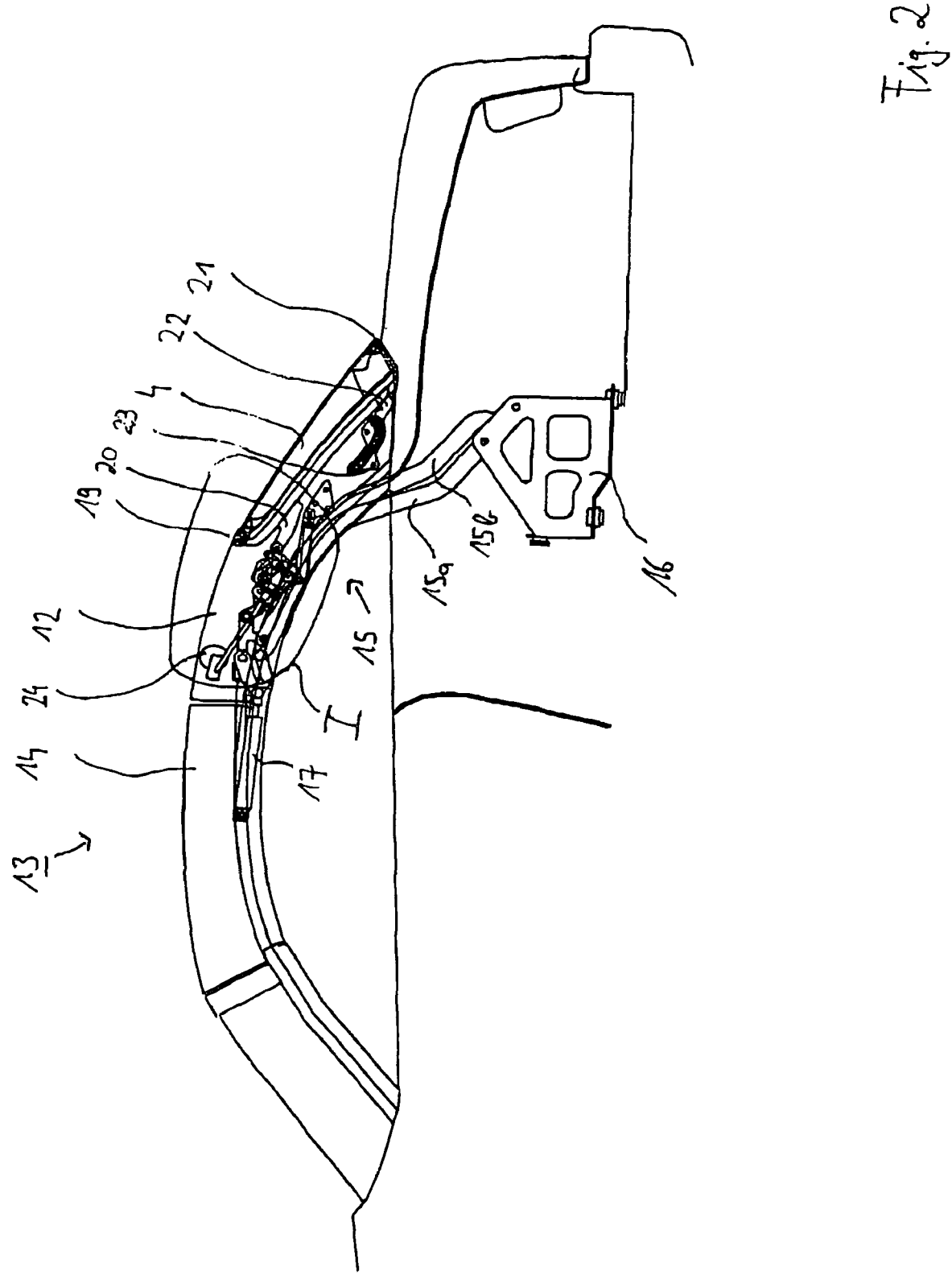
FIG. 2 shows a side view of a vehicle with a cabriolet top, with a device in the operating position according to FIG. 1.

The elements of the device 1 that are explained in FIG. 1 are provided on a rear, first roof shell 12 of a foldable cabriolet top 13, which is shown in a closed state in the longitudinal cross-sectional view of FIG. 2. In front of the first roof shell 12 in the direction of travel, the cabriolet top 13 comprises a second roof shell 14, which is pin-jointed in a known manner via a main four-bar linkage 15 with a front main link 15a and a rear main link 15b to a main bearing unit 16, which is secured on the bodywork of the vehicle. In the region of the main bearing unit 16, there is a force introduction unit (not shown) which is designed as a rotatable hydraulic cylinder and by means of which the main four-bar linkage 15 can be pivoted about the main bearing unit 16. The first roof shell 12 is pin-jointed with the second roof shell 14 essentially by means of the roof shell link 10. A driving device 17, which is designed as a hydraulic linear cylinder, is supported on one side on the second roof shell 14 and on the other side on an end of the roof shell link 10, which end is opposite the second fixed bearing 6. An opening of the cabriolet top 13 is initiated by pivoting the first roof shell 12 forwards in the direction of travel relative to the second roof shell 14 by the driving device 17 being actuated. This is explained further in full detail with reference to FIGS. 8 and 9.

Figure 3:
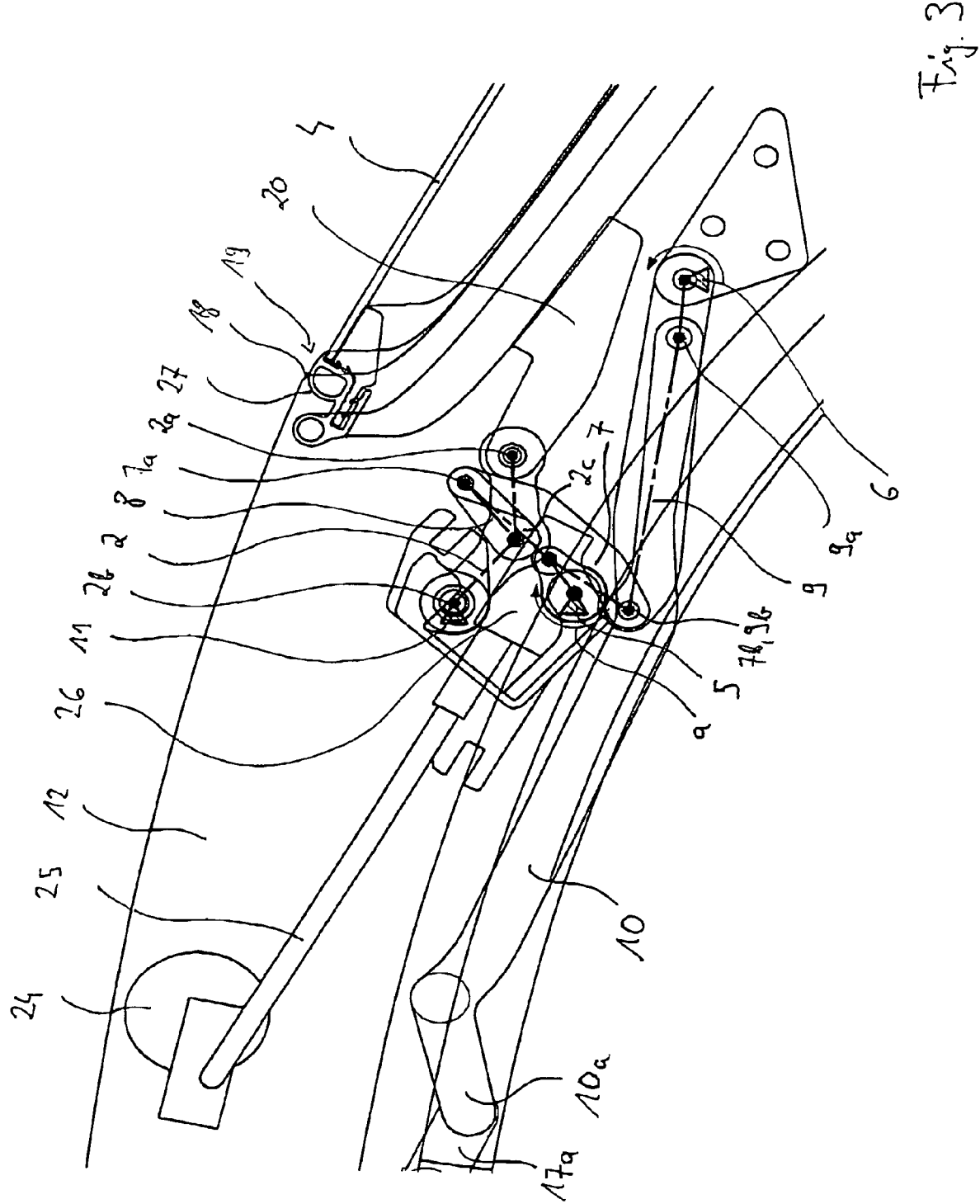
FIG. 3 shows an enlarged longitudinal cross-sectional view of the region I from FIG. 2.

The three fixed bearings 5, 6, 11 are in each case fixed on a lower side of the first roof shell 12, so that the individual linking elements of the device 1 are supported by the first roof shell 12. The first roof shell has a recess which is matched to the outer contour of the rear window 4 and defines a rear window frame 18 (FIG. 3). In the position of the links according to FIGS. 1 and 2, the rear window 4 is held in the rear window frame 18, so that a closed position of the rear window 4 is thereby defined. A first bearing limb 20 is fixed on the rear window 4 adjacent to its upper transverse side edge 19, the bearing limb being pin-jointed with the end articulation point 2a of the control lever 2. A second bearing limb 22 is fixed on a lower transverse side edge 21 of the rear window 4, said bearing limb being mounted rotatably and displaceably about a fourth fixed bearing 23 fixed on the first roof element 12. In the longitudinal sectional views which have been explained, only one element is to be seen in each case and reference is correspondingly made thereto.

It goes without saying that the device 1 according to the invention is expediently provided in pairs, i.e. in each case in a left and right region of the first roof shell, in order to ensure that the rear window is articulated in a uniform and jam-free manner. The same also applies analogously to the first and second bearing limbs 20, 22 and the roof shell link 10.

FIG. 3 shows an enlarged longitudinal sectional view of the region I from FIG. 2. A driving unit 24, which drives a flexible rotary shaft 25, is fastened to the first roof shell 12 approximately in the region of the centre of the vehicle. It cannot be seen in FIG. 3 that a respective flexible rotary shaft 25 is guided away from the driving unit 24 to the left and to the right, in the direction of the corresponding left-side or right-side device 1. In the longitudinal sectional view according to FIG. 3, only one of the two devices 1 is shown. A worm gear mechanism 26 which is coupled to the rotary shaft 25 is provided adjacent to the first fixed bearing 5. The worm gear mechanism 26 suitably converts a rotation of the rotary shaft 25 into a rotation of the driving link 3 about the first fixed bearing 5, as indicated by the arrow a in FIG. 3. In the operating position of the device 1 according to FIG. 3, the rear window 4 is in its closed position. In this case, a seal 27 which runs around the rear window 4 is positioned against the recess or rear window frame 18 of the first roof shell 12 in order to ensure a sealing fit of the rear window 4.

Figure 4:
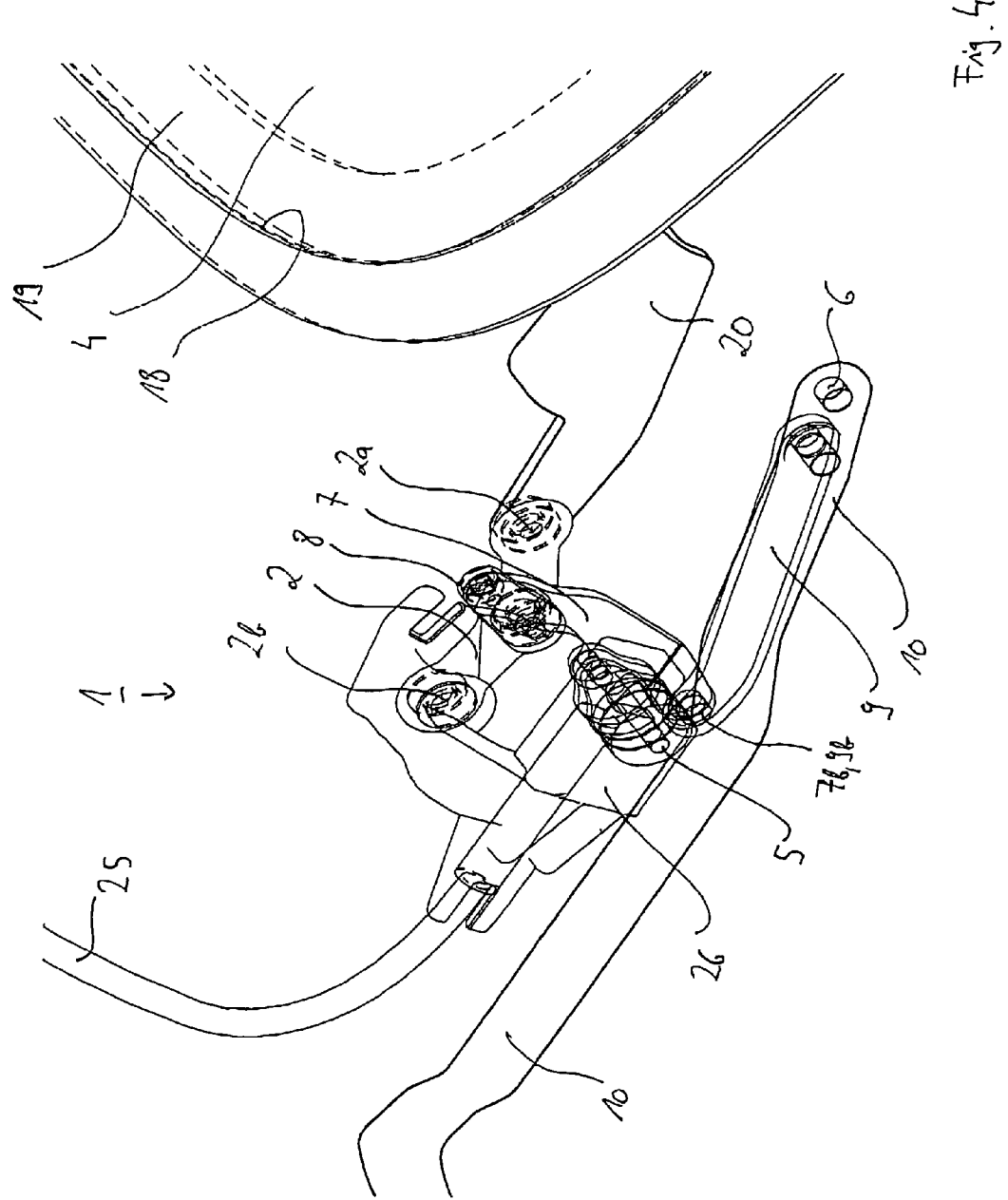
FIG. 4 shows a cutout perspective view of the device from FIG. 3.
Figure 5:
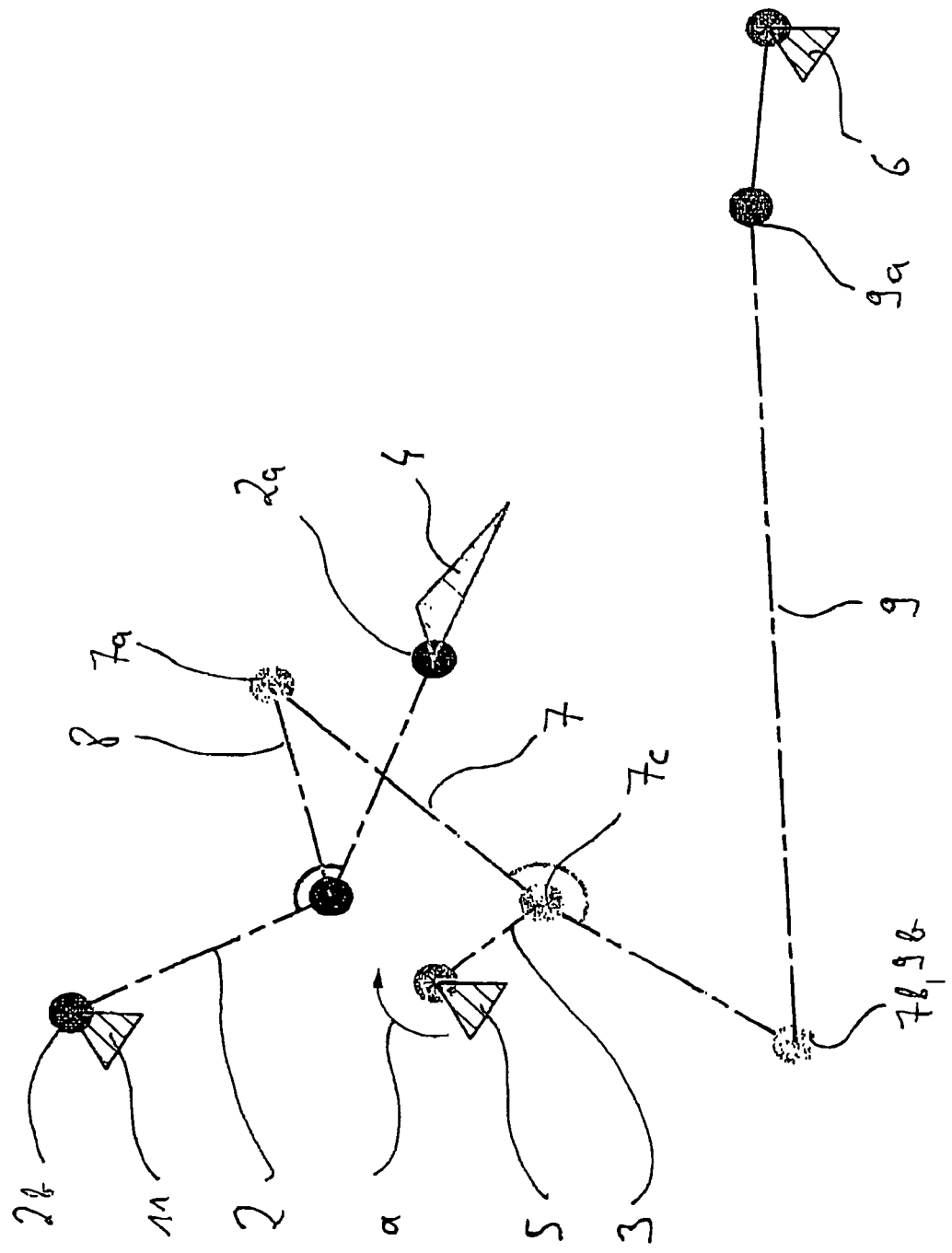
FIG. 5 shows the arrangement of the links from FIG. 1, with the rear window in the ventilation position.

FIG. 4 shows the device 1 from FIG. 3 in a perspective view and with further roof elements or link elements being left out. The rotary shaft 25 is guided out of the worm gear mechanism 26 in the direction of travel and is connected to the driving unit 24 (not shown in FIG. 4) which is fastened to the first roof shell 12 approximately in the region of the centre of the vehicle. The flexibility and pliability of the rotary shaft 25 makes it possible for the rotary shaft 25 to be guided along the first roof shell 12 in a space-saving manner.

The driving link 3 and the coupling link 9 together with the first and second auxiliary links 7, 8 form a restricted guidance for the control lever 2. A rotation of the driving link 3 about the first fixed bearing 5 is transmitted via the first auxiliary link 7 and the second auxiliary link 8 to the control lever 2, so that the control lever 2 pivots about the third fixed bearing 11. A rotation of the driving link 3 about the first fixed bearing 5 therefore leads to a shifting of the end articulation point 2a of the control lever 2 substantially in the vertical direction. This operating principle makes it possible for the rear window 4 to be transferred from its closed position into a ventilation position, which is explained in detail below.

Figure 6:
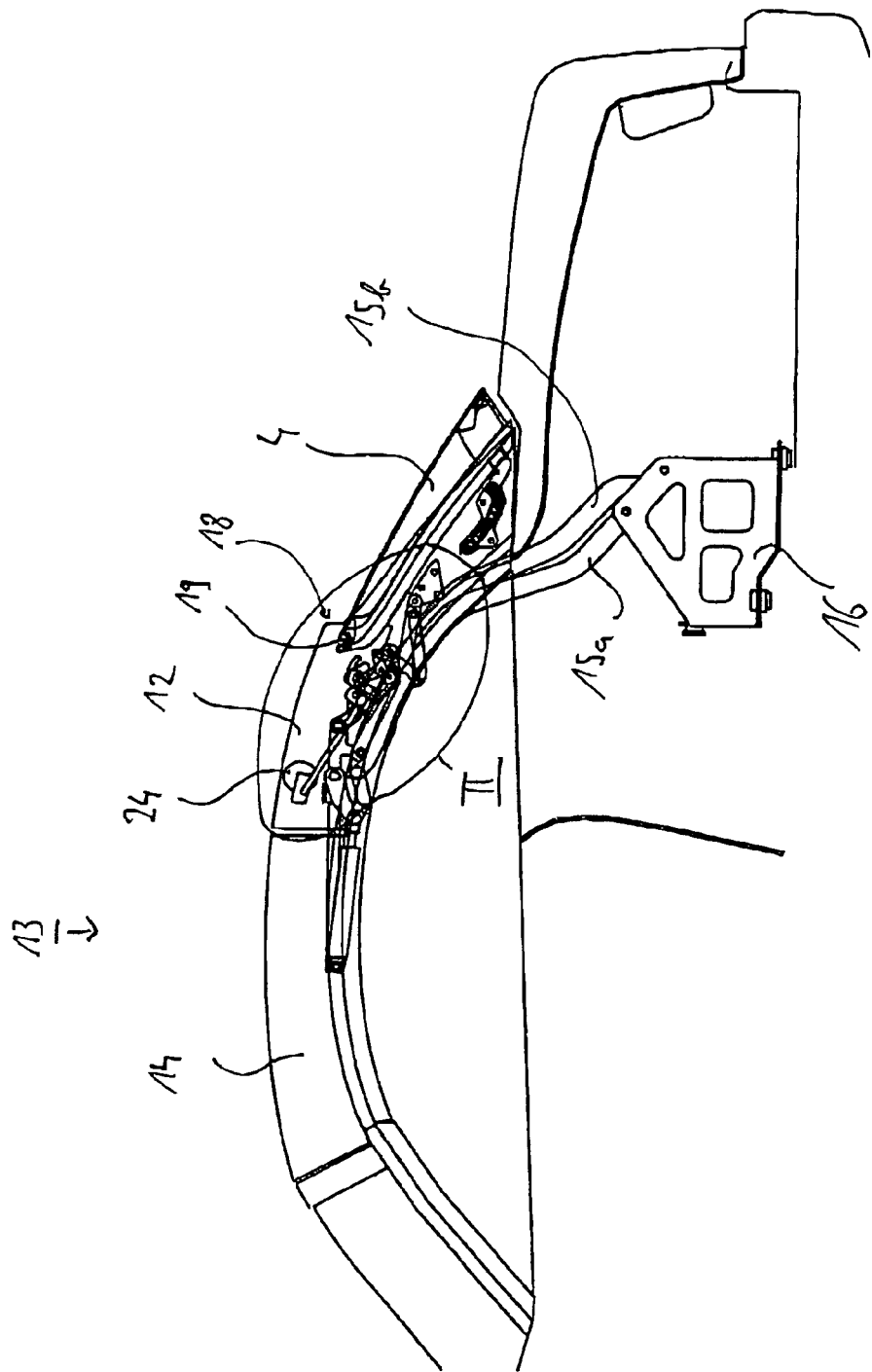
FIG. 6 shows a side view of the vehicle from FIG. 2 with the device in an operating position according to FIG. 5.
Figure 7:
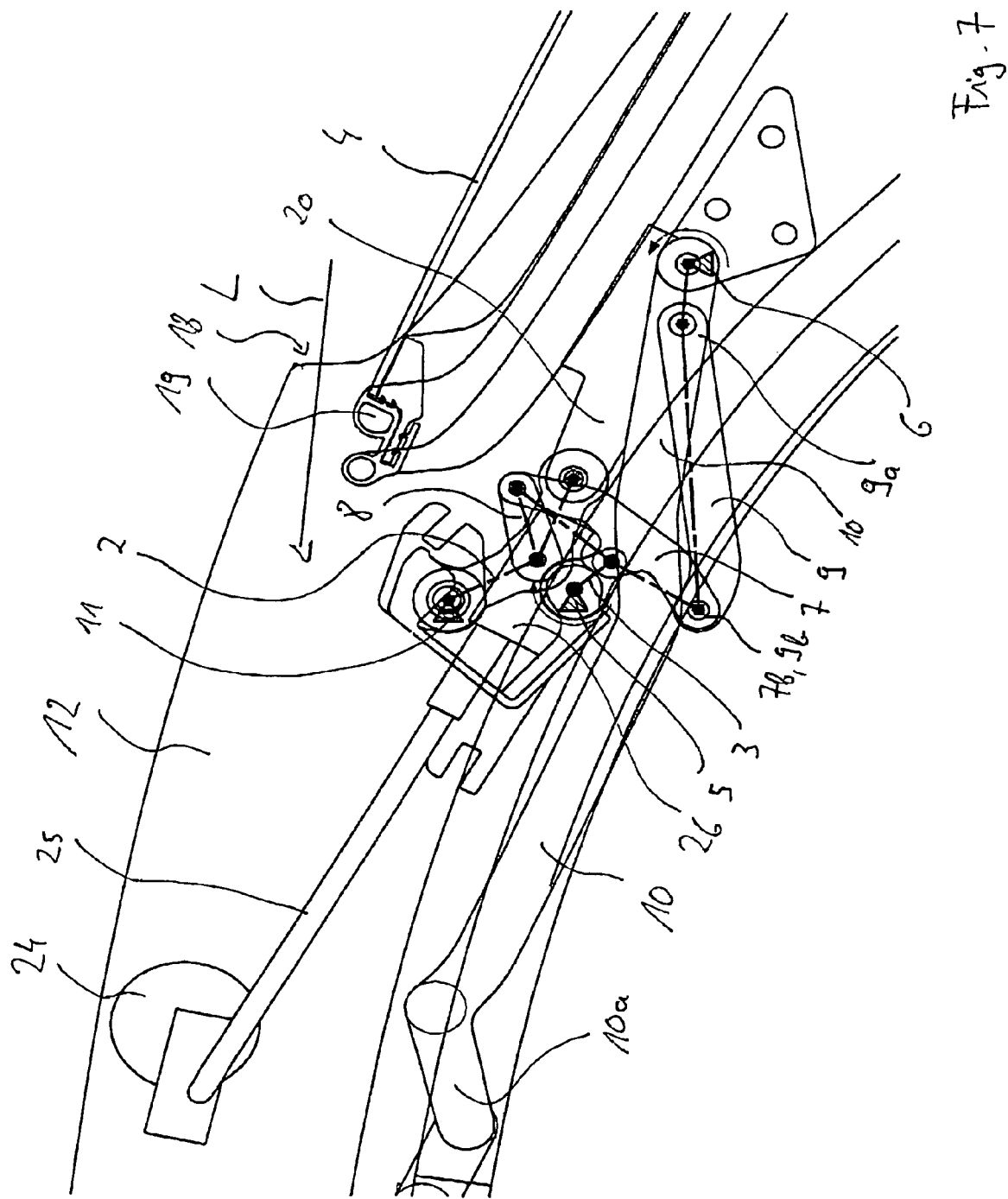
FIG. 7 shows an enlarged longitudinal cross-sectional view of the region II from FIG. 6.

In the illustrations according to FIGS. 1 to 4, the rear window 4 is in its closed position. Starting therefrom, the driving link 3 is rotated by the driving unit 24, by means of the coupling via the rotary shaft 25 and the worm gear mechanism 26, about the first fixed bearing 5 (in the clockwise direction in FIG. 5, arrow a), which correspondingly lowers the first auxiliary link 7. The lowering of the first auxiliary link 7 is transmitted via the second auxiliary link 8 to the central articulation point 2c of the control lever 2, which leads to a pivoting of the control lever 2 about the third fixed bearing 11 (likewise in the clockwise direction in FIG. 5). Consequently, the end articulation point 2a of the control lever 2 is shifted substantially in the vertical direction downwards, so that, as a result, the upper transverse side edge 19 of the rear window 4 is moved out of the rear window frame 18. In conjunction with the mounting of the rear window 4 by means of the second bearing limb 22, a tilting movement of the rear window 4 arises, by means of which it is transferred into a ventilation position. FIGS. 6 and 7 show the rear window in its ventilation position. It can be seen in particular in the longitudinal sectional view of FIG. 7 that the upper transverse side edge 19 of the rear window 4 is lifted out of the rear window frame 18, which ensures that the vehicle interior is ventilated, which is indicated by an arrow L.

The rear window 4 is transferred back into its closed position correspondingly in a reversal of the kinematics. In the process, the driving unit 24 is driven in the opposite direction, as a result of which the driving link 3 rotates in the anticlockwise direction about the first fixed bearing 5 in the view of FIG. 5. This causes the end articulation point 2a of the control lever 2 together with the first bearing limb 20 to be shifted upwards, so that the rear window 4 passes back into the rear window frame 18.

During the transfer of the rear window 4 from its closed position into its ventilation position—with the cabriolet top 13 closed—the roof shell link 10 is not actuated, but rather functions primarily as a means of linking the end articulation point 9a of the coupling link 9.

An operation to open the cabriolet top 13 and the function of the device 1 are explained below.

Figure 8:
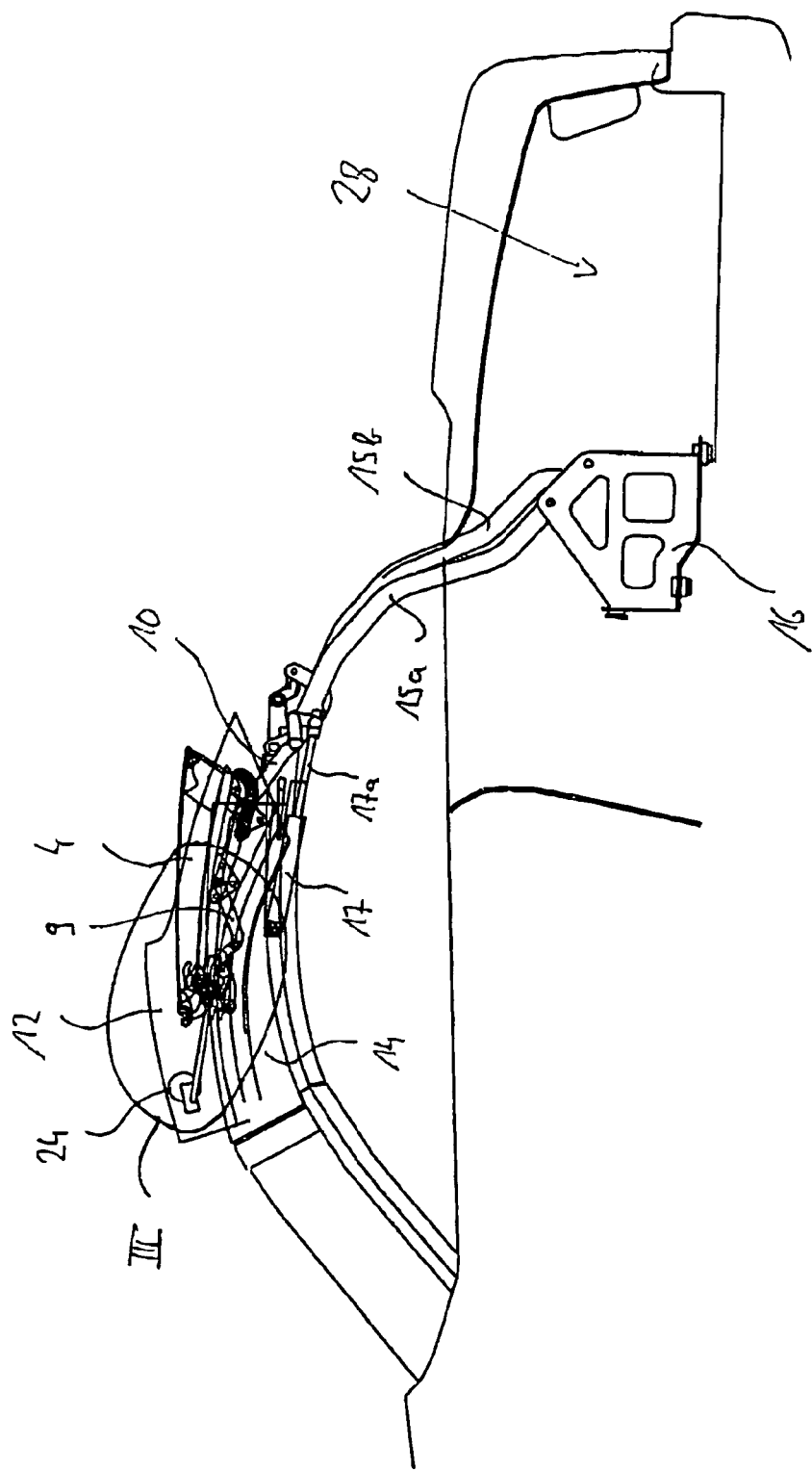
FIG. 8 shows the vehicle from FIG. 2 with a rear roof shell pivoted in the direction of travel.

An opening of the cabriolet top 13 is initiated by the first roof shell 12 being pivoted forwards in the direction of travel over the second roof shell 14. FIG. 8 shows such a position of the first roof shell 12 in a longitudinal sectional view. The roof shell link 10 is linked at its end 10a opposite the second fixed bearing 6 to an extension arm of the roof shell 14, with a piston rod 17a of the driving device 17 being fixed to this end of the roof shell link 10a. From the closed state of the top, the first roof shell 12 is pivoted forwards over the second roof shell 14 by actuation of the driving device 17, as a result of which the roof shell link 10 is pivoted about the front roof shell 14 and therefore the first roof shell 12 relative to the second roof shell 14. According to the invention, upon this pivoting forwards of the roof shell link 10, the rear window 4, as a consequence of the restricted guidance of the respective linking elements of the device 1, is lifted out of the rear window frame 18 of the first roof shell 12. This is explained in detail below.

Figure 9:
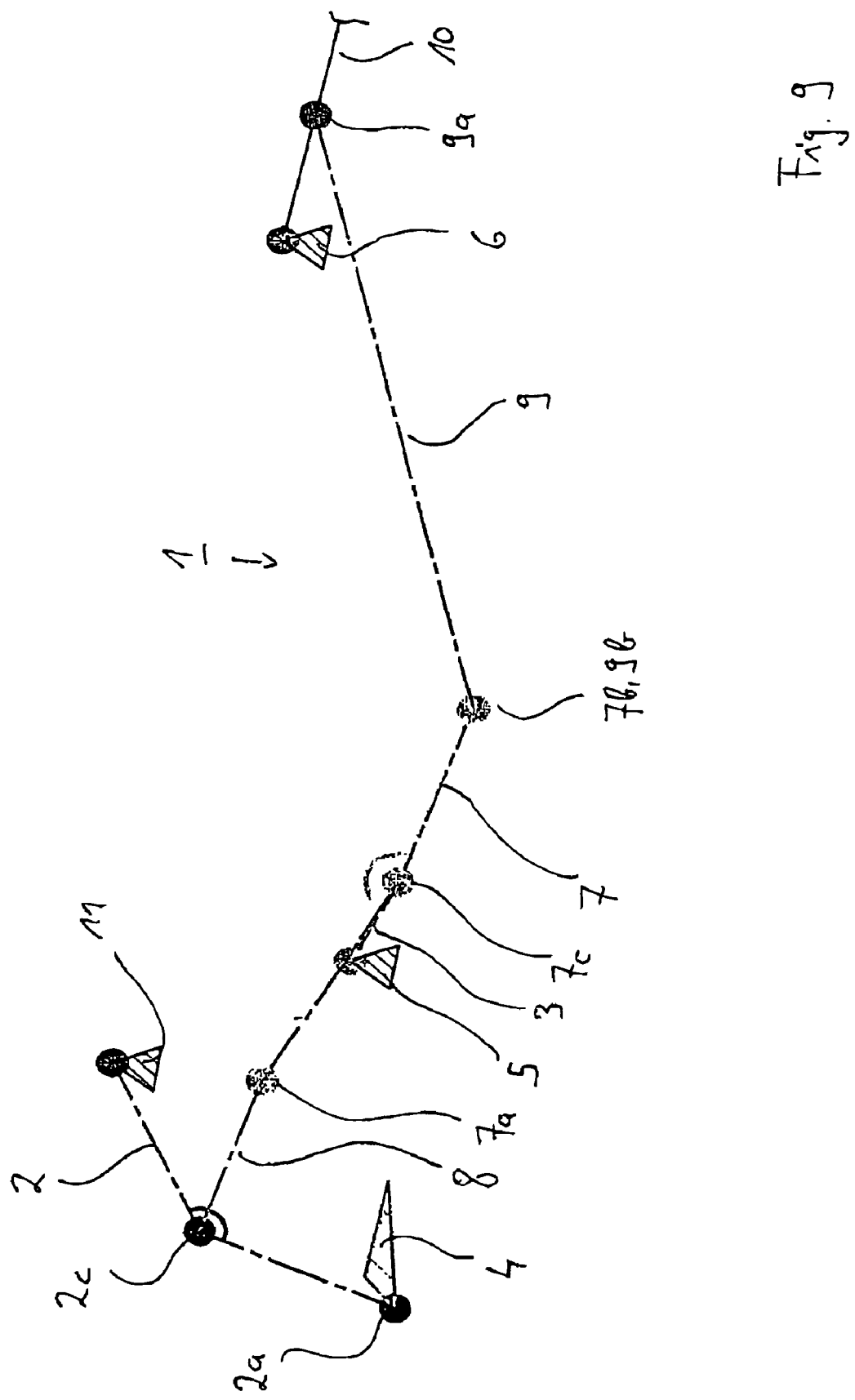
FIG. 9 shows a schematic illustration of the links of the device in an operating position according to FIG. 8.
Figure 10:
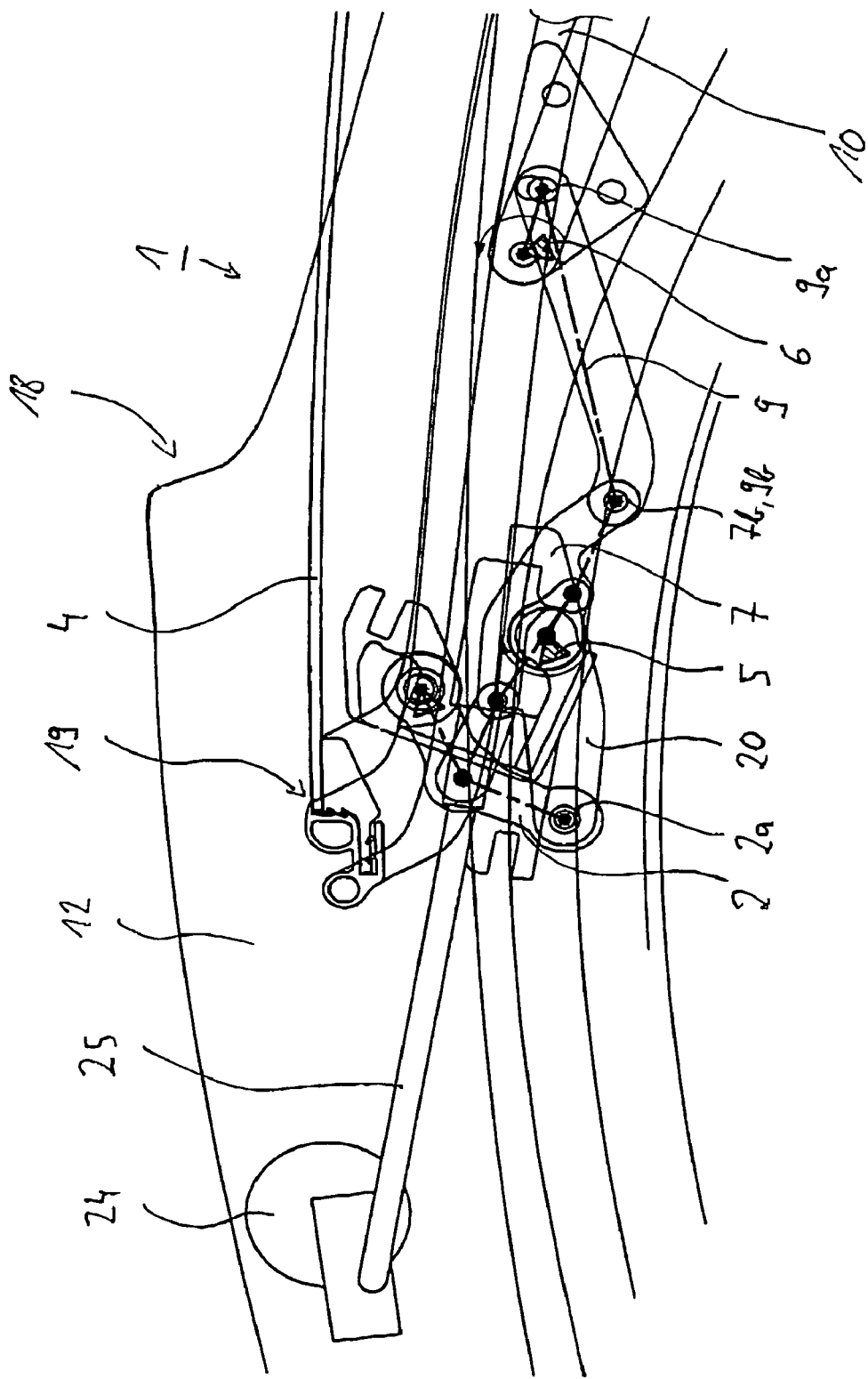
FIG. 10 shows an enlarged longitudinal cross-sectional view of the region III from FIG. 8.

FIG. 9 shows a schematic illustration of the links of the device 1 in the position of the first roof shell 12 according to FIG. 8. FIG. 10 shows an enlarged longitudinal sectional view of the region III from FIG. 8. Upon the pivoting forwards of the first roof shell 12, a force is introduced into the kinematic articulation system of the device 1 via the roof shell link 10. Before movement is initiated by the roof shell link 10, the driving link 3 is moved by the driving unit 24 into its lower position. Only after this is a movement of the top, i.e. a pivoting of the first roof shell 12, possible. The enlarged longitudinal sectional view according to FIG. 10 once again clearly shows that, in the roof position according to FIG. 8, the rear window 4 is lifted out of the rear window frame 18 and is additionally shifted forwards, i.e. in the direction of travel. The rear window 4 is lifted out of the rear window frame 18 by previous activation of the driving link 3. Starting from this intermediate state, the first roof shell 12 and the second roof shell 14 can be put away in a rear region 28 of the vehicle by pivoting the front and rear main links 15a, 15b about the main bearing unit 16. The position of the rear window 4 remains unchanged here in comparison to the position according to FIG. 8.

Figure 11:
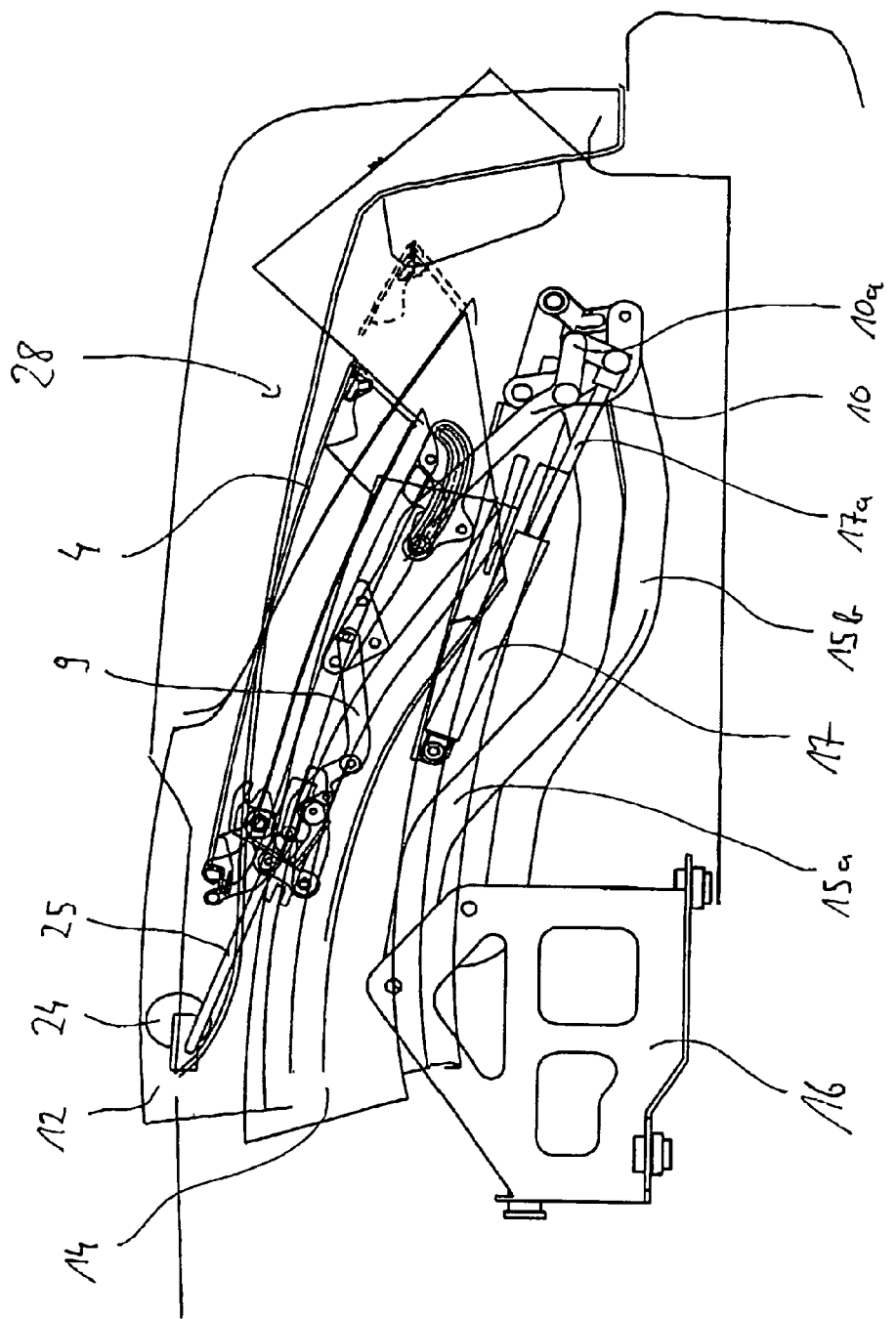
FIG. 11 shows a longitudinal sectional view of the vehicle roof which has been opened and put away in the rear region of a vehicle.

The lifting of the rear window 4 out of its rear window frame 18 in the put-away position according to FIG. 11 has the advantage that the remaining loading dimension in the rear region 28 of the vehicle is increased. When the roof shell link 10 is pivoted about the front roof shell 14, the restricted coupling by means of the device 1 causes the rear window 4 to be automatically pushed forwards without a separate drive being required for this. This forcibly controlled displacement of the rear window 4 effectively prevents the rear window 4 from colliding with the two roof shells 12,14 and renders a control with the detection of the position of the rear window 4 superfluous.

FIGS. 12 to 17 show a further embodiment of the device 1 according to the invention. Components which are identical here in comparison to the previously explained embodiment are provided with the same reference numbers.

Figure 12:
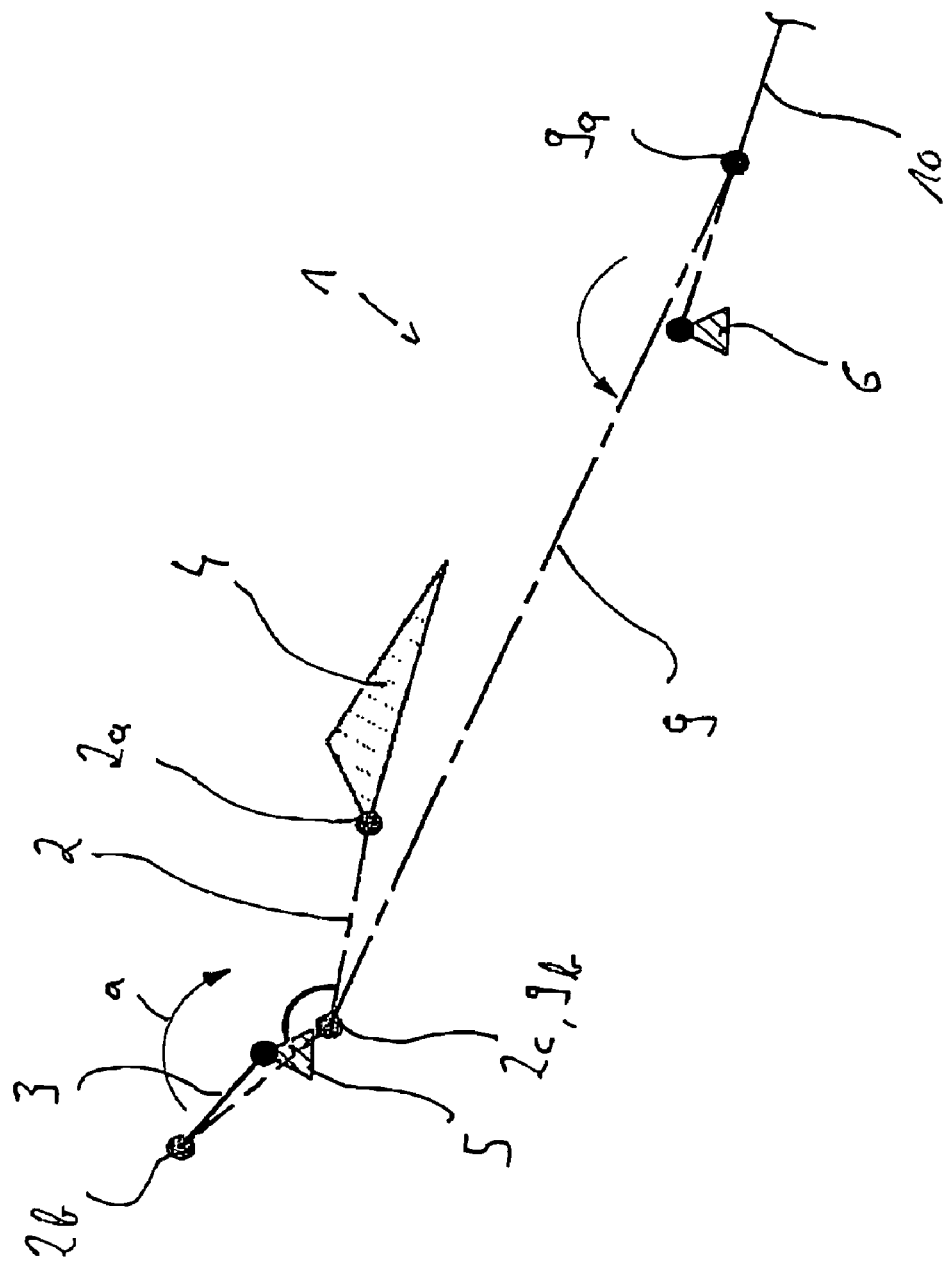
FIG. 12 shows a schematic illustration of the links of the device according to the invention in an alternative embodiment, with the rear window in the closed position.

As can be seen in the schematic illustration of the links according to FIG. 12, the driving link 3 is pin-jointed at its free end directly with the end articulation point 2b of the control lever 2. The end articulation point 9b of the coupling link 9 is pin-jointed with the central articulation point 2c of the control lever 2. The articulated connection of the end articulation point 2a of the control lever 2 to the first bearing limb 20 of the rear window 4 and of the end articulation point 9a of the coupling link 9 to the roof shell link 10 remains the same in principle. In contrast to the embodiment of FIGS. 1 to 11, this embodiment of the device 1 therefore manages without a first and second auxiliary link, which results in lower production costs as a consequence of fewer components.

Figure 13:
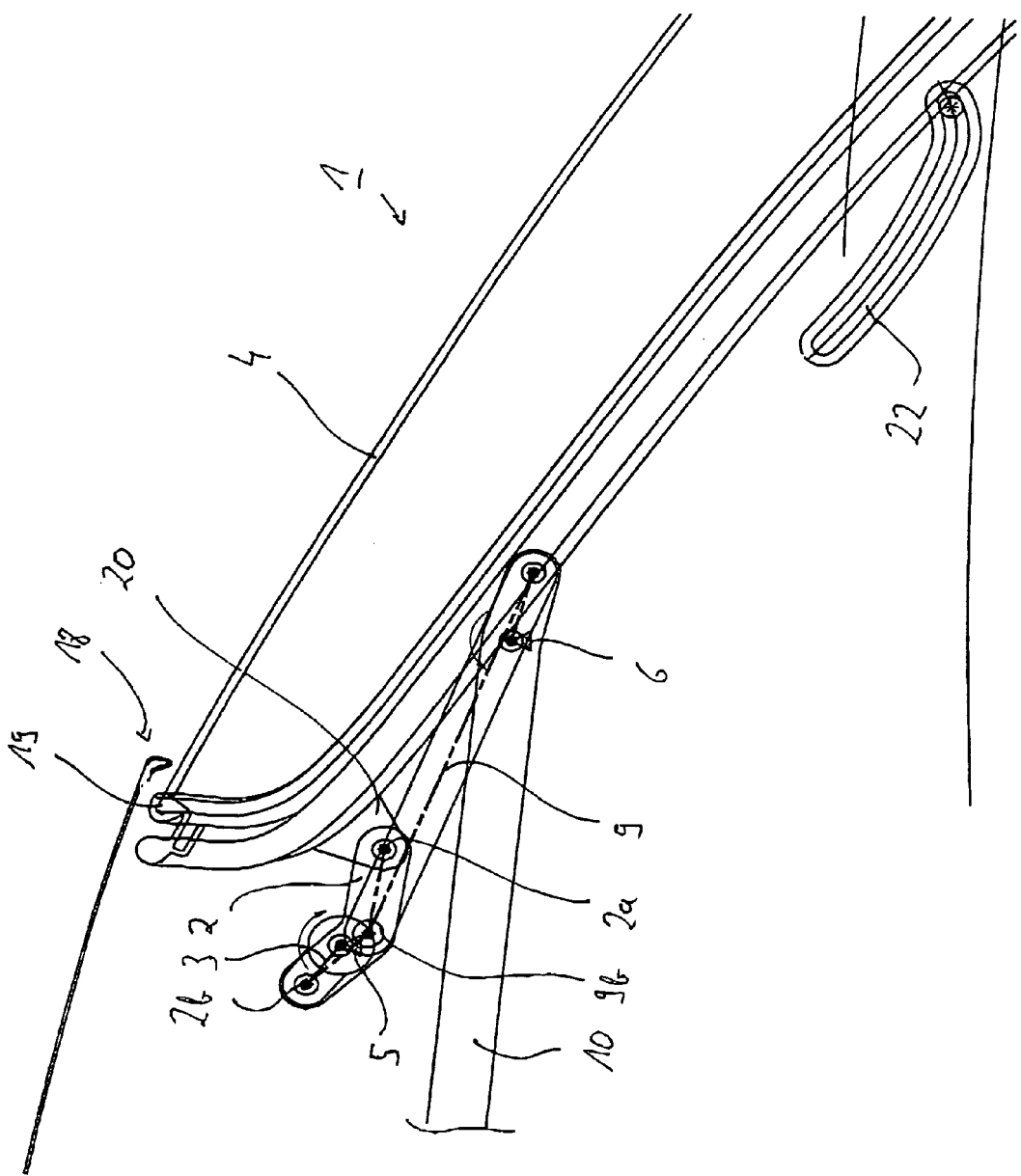
FIG. 13 shows an enlarged longitudinal cross-sectional view of the device from FIG. 12, with the rear window in the closed position.
Figure 14:
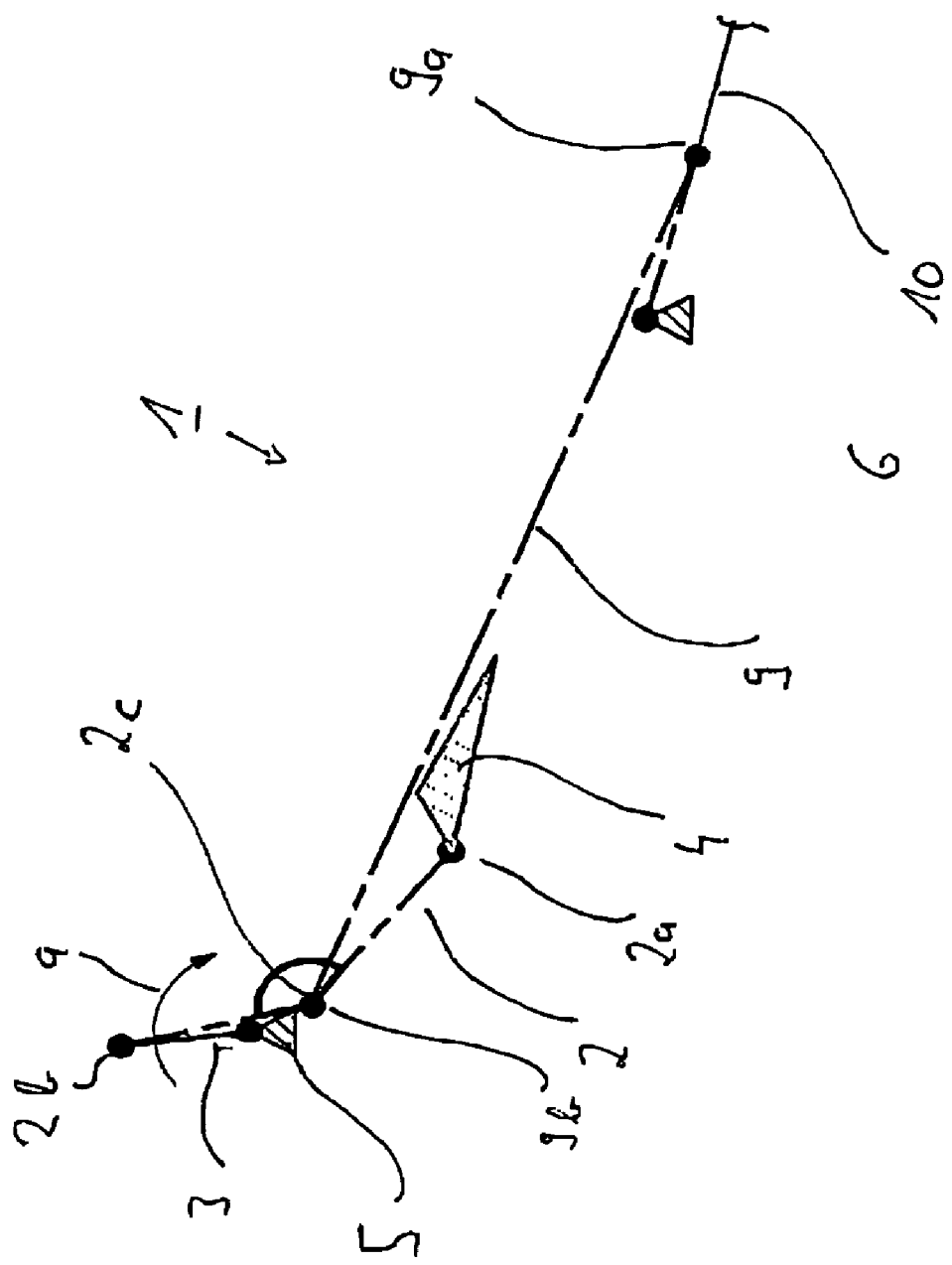
FIG. 14 shows a schematic illustration of the links of the device according to FIG. 12, with the rear window in the ventilation position.
Figure 15:
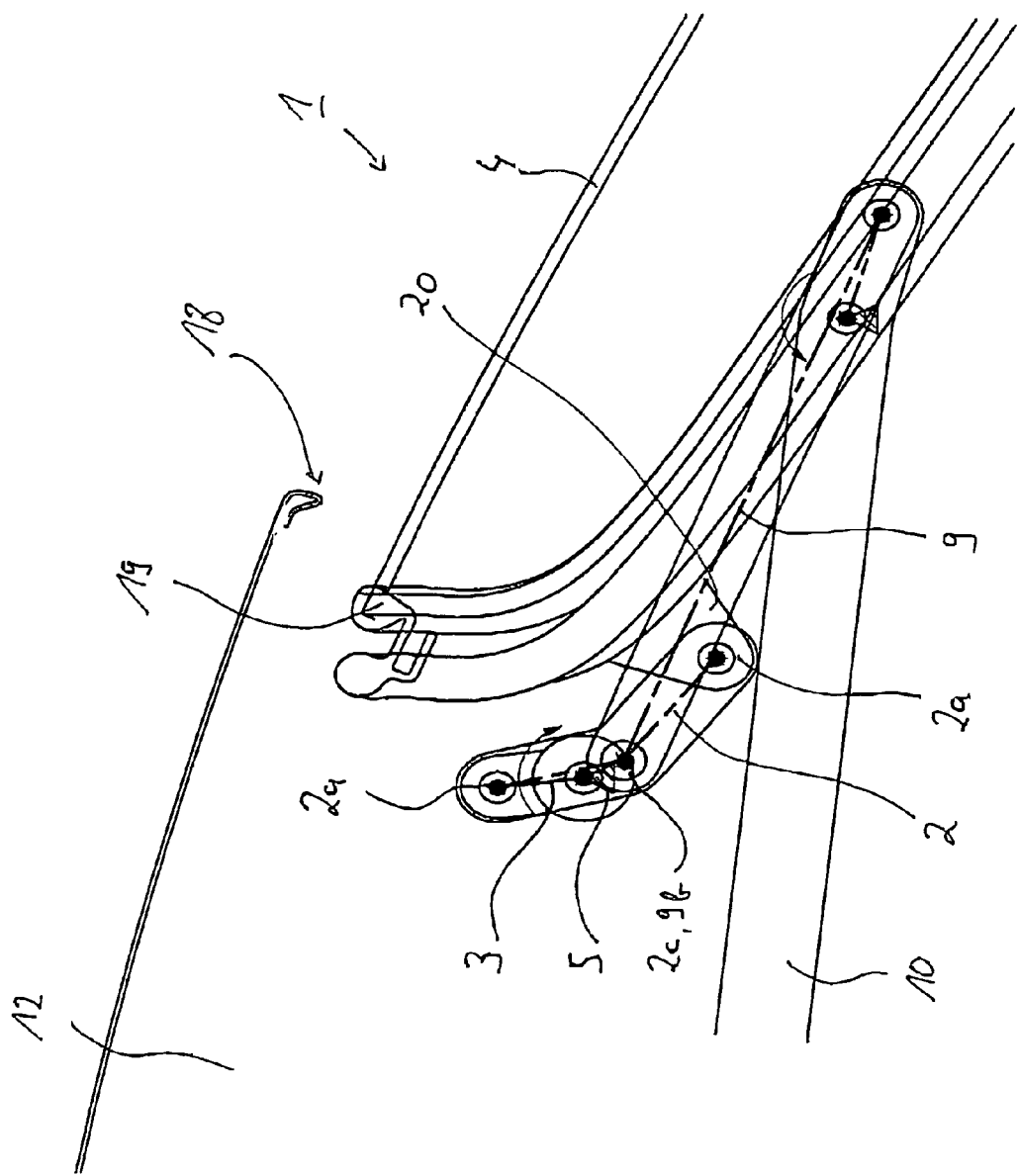
FIG. 15 shows an enlarged longitudinal cross-sectional view of the device from FIG. 14, with the rear window in the ventilation position.

FIG. 12 shows the rear window 4 in its closed position, analogously to the illustration according to FIG. 1. The driving link 3 here is brought into a position beyond the dead centre, so that a separate locking of the rear window 4 is unnecessary. The longitudinal sectional view according to FIG. 13 shows the rear window 4 likewise in its closed position. An actuation of the driving unit 24 offsets the driving link 3 via the rotary shaft 25 and the worm gear mechanism 26 into a rotation in the clockwise direction, arrow a, about the first fixed bearing 5 in FIGS. 12, 13. By this means, the end articulation point 2a of the control lever 2 is substantially shifted in the vertical direction downwards, analogously to the illustration according to FIG. 5, and the rear window 4 is transferred into its ventilation position. This state is shown in the schematic illustration of the links of FIG. 14 and in the longitudinal sectional view according to FIG. 15.

Figure 16:
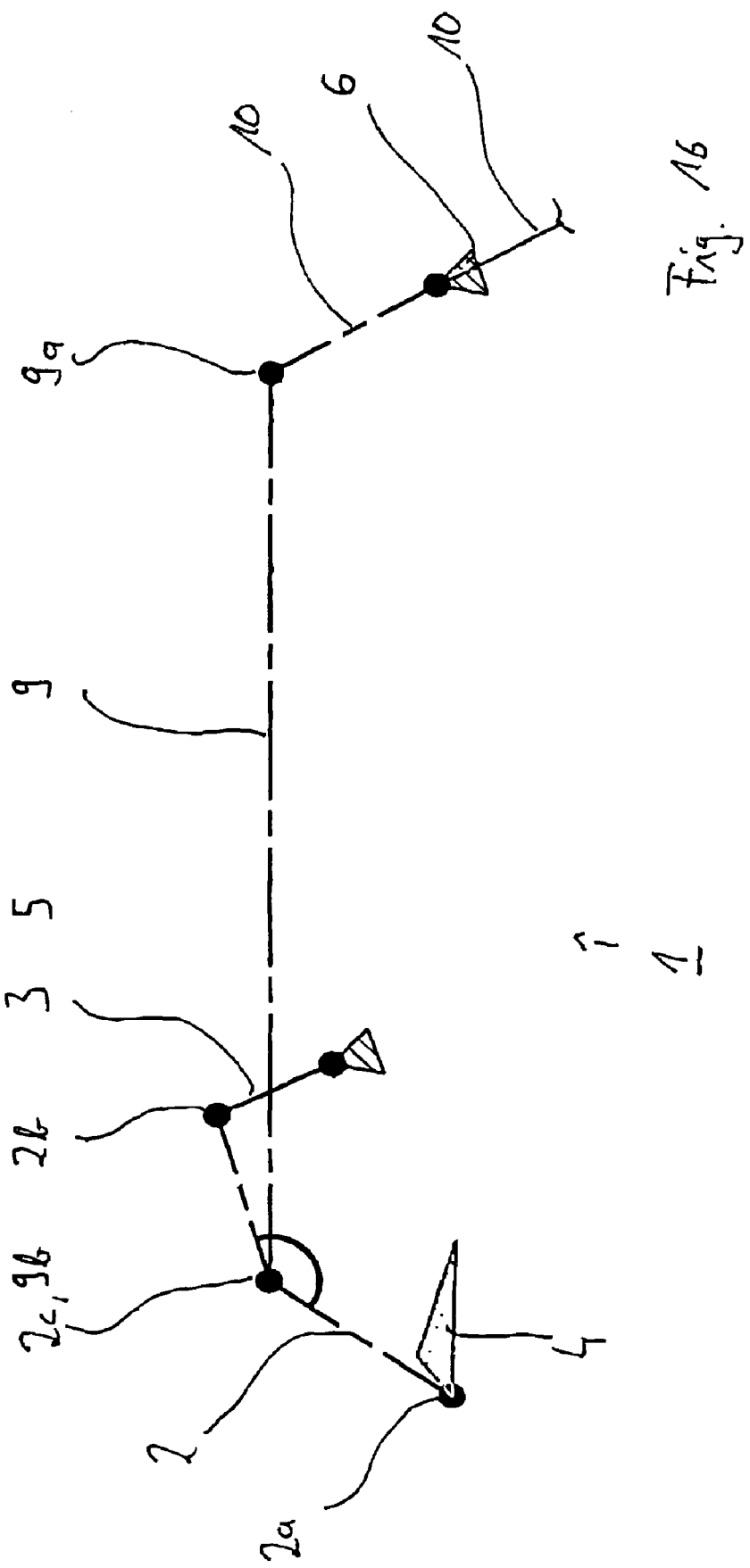
FIG. 16 shows the device from FIG. 12 in an operating position according to the roof position of FIG. 8.
Figure 17:
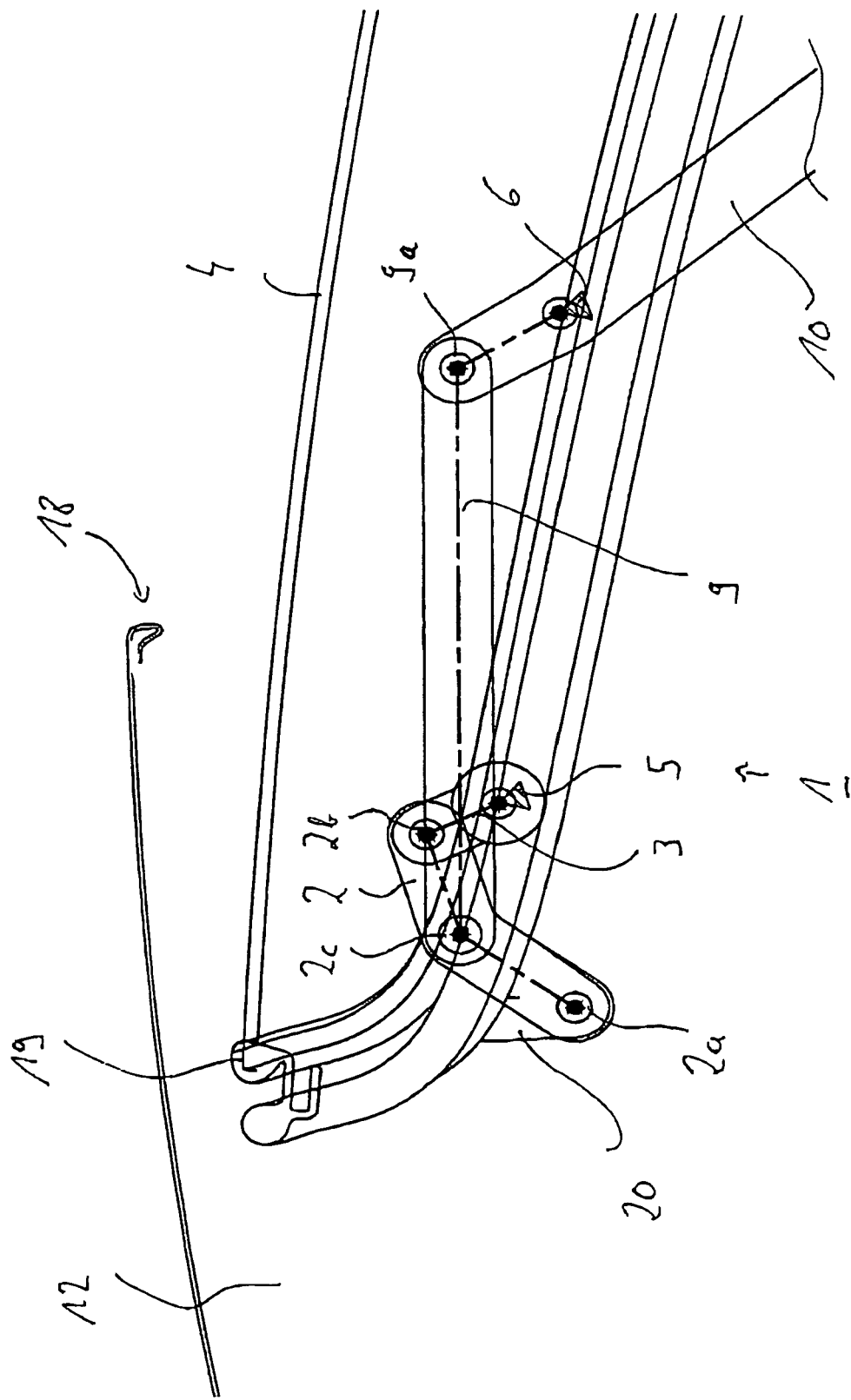
FIG. 17 shows an enlarged longitudinal cross-sectional view of the device, in the operating position according to FIG. 16.

If, starting from the closed state of the top, the first roof shell 12 is pivoted forwards in the direction of travel over the second roof shell 14, the device 1, in the embodiment shown in FIGS. 12 to 15, likewise ensures a restricted control of the rear window 4 for displacement forwards, analogously to the explanation according to FIGS. 8 to 10. The position of the kinematic articulation system of the device 1 for the position of the first roof shell 12 according to the illustration of FIG. 8 is shown in FIG. 16. Driving of the roof shell link 10 by actuation of the driving device 17 introduces a force via the coupling link 9 into the kinematic articulation system of the device 1, as a result of which the control lever 2 is pivoted into the position shown in FIG. 16. In this position, as can also be seen in the longitudinal sectional view of FIG. 17, the rear window 4 is lifted out of the rear window frame 18 and is shifted forwards in the direction of travel, analogously to the position shown in FIG. 10.

The device 1 according to the invention permits the rear window 4 to be transferred from its closed position into its ventilation position when the cabriolet top 13 is closed, so that the vehicle interior can be ventilated without an annoying draught. Furthermore, the device 1 ensures a restricted control of the rear window 4 during a pivoting of the first roof shell 12 relative to the second roof shell 14, in order to lift the rear window 4 out of the rear window frame 18. A separate driving mechanism for such a restricted control of the rear window 4 is not required, since it is already provided by the device 1.

The invention claimed is:

1. A device for activating a rear window of a motor vehicle, comprising
   a control lever designed as a 3-point link, which is pin-jointed at one end with the rear window,
   a driving link, which can be driven rotatably about a first bearing, and
   a coupling link, which is guided pivotably about a second bearing,
   wherein at least the first bearing is arranged on a roof element of the motor vehicle,
   wherein the roof element is displaceable with respect to a body work of the motor vehicle, and
   wherein the control lever is coupled to the driving link and the coupling link in a restricted guidance, such that a rotation of the driving link about the first bearing shifts the linking point of the control lever to the rear window substantially vertically.

2. The device according to claim 1, wherein the driving link is pin-jointed with the other end of the control lever, and the coupling link is pin-jointed with the central articulation point of the control lever.

3. The device according to claim 1, wherein, in the closed position of the rear window, the driving link is in a position beyond the dead center.

4. The device according to claim 1, wherein a displacement of the rear window is coupled to a displacement of the roof element.

5. The device according to claim 1, wherein the second bearing is attached to the roof element and the pivotal guiding of the coupling link about the second bearing is eccentric about the second bearing.

6. The device according to claim 1, wherein the coupling link and the driving link are operable independently from each other.

7. The device according to claim 1, wherein the substantially vertical shifting of the linking point of the control lever to the rear window is achieved by a pivotal movement of the driving link while the coupling link substantially remains in place.

8. The device according to claim 1, wherein after the substantially vertically shifting of the linking point of the control lever to the rear window, the linking point is substantially shifted in a direction forwards with respect to the motor vehicle.

9. The device according to claim 1, wherein the substantially forward shifting of the linking point of the control lever to the rear window is achieved by a pivotal movement of the coupling link while the driving link substantially remains in place.

10. A device for displacing a rear window of a motor vehicle comprising:
   a control lever designed as a 3-point link having a first end pin-jointed in a linking point with the rear window,
   a driving link, which can be driven rotatably about a first bearing,
   a coupling link, which is guided pivotably about a second bearing, and
   a first auxiliary link designed as a 3-point link,
   wherein at least the first bearing is arranged on a roof element of the motor vehicle, and
   wherein the control lever is coupled to the driving link and the coupling link in a restricted guidance, such that a rotation of the driving link about the first bearing shifts the linking point of the control lever and of the rear window substantially vertically,
   wherein a second end of the control lever is mounted rotatably about a third bearing attached to the roof element,
   wherein the first auxiliary link is linked at one end to the coupling link,
   wherein the first auxiliary link is coupled at an end to the control lever,
   wherein the driving link is linked to a central articulation point of the first auxiliary link.

11. The device according to claim 10, wherein the rear window can be moved out of a rear window frame of the vehicle roof from a closed position into a ventilation position by a rotation of the driving link about the first bearing.

12. The device according to claim 10, wherein the second bearing is arranged on the roof element.

13. The device according to claim 10, wherein the control lever is of angled design at its central articulation point.

14. The device according to claim 10, wherein the end of the first auxiliary link being opposite to the coupling link and a central articulation point of the control lever are pin-jointed via a second auxiliary link.

15. The device according to claim 10, wherein the first auxiliary link is of angled design at its central articulation point.

16. The device according to claim 10, wherein the driving link is motor-driven via one of a worm gear mechanism and a pull-push linkage.

17. The device according to claim 10, further comprising a first bearing limb which is attached to the rear window adjacent to its upper transverse side edge, the control lever and the bearing limb being pin-jointed.

18. The device according to claim 17, further comprising a second bearing limb which is attached to the rear window adjacent to its lower transverse side edge, the second bearing limb being mounted rotatably about a fourth bearing attached to the roof element.

19. The device according to claim 10, wherein the roof element is part of a convertible top, with an end of the coupling link which is opposite to one of the first auxiliary link and the control lever being pin-jointed with a roof shell link linked to the second bearing.

20. The device according to claim 19, wherein the roof element is a rear, fixed, first roof shell, with the roof shell link being linked at its end opposite the second bearing to a second roof shell situated in front of the first roof shell in the direction of travel, so that, when opening the cabriolet top, the rear window can be deposited with the first roof shell in an intermediate position on the second roof shell by means of actuating the roof shell link.

21. The device according to claim 20, wherein the rear window is lifted out of the rear window frame in the intermediate position.

* * * * *